United States Patent
Shearer et al.

(10) Patent No.: US 11,727,452 B1
(45) Date of Patent: Aug. 15, 2023

(54) INVOICE FINANCING AND REPAYMENT

(71) Applicant: BLOCK, INC., San Francisco, CA (US)

(72) Inventors: Douglas Justin Shearer, Alameda, CA (US); Matthew Allen Todd, Oakland, CA (US)

(73) Assignee: BLOCK, INC., Oakland, CA (US)

( * ) Notice: Subject to any disclaimer, the term of this patent is extended or adjusted under 35 U.S.C. 154(b) by 269 days.

(21) Appl. No.: 17/128,911

(22) Filed: Dec. 21, 2020

Related U.S. Application Data

(63) Continuation of application No. 15/722,003, filed on Oct. 2, 2017, now Pat. No. 10,872,362, which is a
(Continued)

(51) Int. Cl.
*G06Q 30/04* (2012.01)
*G06Q 30/0207* (2023.01)
(Continued)

(52) U.S. Cl.
CPC .......... *G06Q 30/04* (2013.01); *G06Q 20/202* (2013.01); *G06Q 20/322* (2013.01); *G06Q 30/0224* (2013.01)

(58) Field of Classification Search
CPC ....... G06Q 10/00–10; G06Q 30/00–06; G06Q 40/00–06; G06Q 20/10
(Continued)

(56) References Cited

U.S. PATENT DOCUMENTS 6,167,385 A * 12/2000 Hartley-Urquhart ....................... G06Q 30/0206
705/28
6,941,281 B1 * 9/2005 Johnson ................. G06Q 20/04
705/40
(Continued)

FOREIGN PATENT DOCUMENTS

| CA | 2295613 A1 | 1/1999 |
|----|------------|--------|
| CA | 3021034 A1 | 10/2016 |
| WO | 2012150985 A1 | 11/2012 |

OTHER PUBLICATIONS

Final Office Action dated Aug. 9, 2021, for U.S. Appl. No. 17/000,650, of Boates, B., et al., filed Aug. 24, 2020.
(Continued)

*Primary Examiner* — Olusegun Goyea
(74) *Attorney, Agent, or Firm* — Mattingly & Malur, PC

(57) ABSTRACT

Some examples include a payment processing system that receives transaction information of transactions performed between a plurality of merchants and a plurality of buyers, and receives an indication of an invoice generated by a first merchant and payable by a purchasing entity. The payment processing system may determine terms for payment of the invoice based on at least one of: (a) transaction information received from a first computing device of the first merchant configured as a point of sale terminal; (b) transaction information of at least one related merchant determined based on at least one of: a geographic location related to the purchasing entity, or a business type related to the purchasing entity; (c) transaction information of the purchasing entity; or (d) one or more characteristics of the invoice. The payment processing system transmits the terms to the first merchant, and may receive an acceptance from the first merchant.

20 Claims, 10 Drawing Sheets

Related U.S. Application Data continuation of application No. 14/675,257, filed on Mar. 31, 2015, now Pat. No. 9,779,432.

(51) Int. Cl.
   *G06Q 20/32* (2012.01)
   *G06Q 20/20* (2012.01)

(58) Field of Classification Search
   USPC ...... 705/4, 7.12, 7.32, 14.38, 37, 38, 39, 40, 705/45
   See application file for complete search history.

(56) References Cited

U.S. PATENT DOCUMENTS

| | | | | |
|---|---|---|---|---|
| 7,353,203 | B1* | 4/2008 | Kriplani | G06Q 20/04 |
| | | | | 705/39 |
| 8,290,864 | B2 | 10/2012 | Raz et al. | |
| 8,706,624 | B2 | 4/2014 | Don et al. | |
| 9,779,432 | B1 | 10/2017 | Shearer et al. | |
| 9,824,394 | B1 | 11/2017 | Boates et al. | |
| 9,892,458 | B1 | 2/2018 | Shearer et al. | |
| 10,387,882 | B2 | 8/2019 | Hagen et al. | |
| 10,607,199 | B2 | 3/2020 | Cassel et al. | |
| 10,686,781 | B1 | 6/2020 | Kaditz et al. | |
| 10,755,349 | B1 | 8/2020 | Boates et al. | |
| 10,872,362 | B1 | 12/2020 | Shearer et al. | |
| 2002/0038277 | A1* | 3/2002 | Yuan | G06Q 40/04 |
| | | | | 705/26.1 |
| 2004/0064398 | A1* | 4/2004 | Browne | G06Q 40/02 |
| | | | | 705/37 |
| 2005/0283436 | A1 | 12/2005 | Greer et al. | |
| 2007/0174191 | A1* | 7/2007 | Keaton | G06Q 40/04 |
| | | | | 705/40 |
| 2007/0255653 | A1* | 11/2007 | Tumminaro | G06Q 20/3255 |
| | | | | 705/39 |
| 2008/0052229 | A1 | 2/2008 | Sheinker et al. | |
| 2008/0109348 | A1 | 5/2008 | Saxena et al. | |
| 2008/0154769 | A1* | 6/2008 | Anderson | G06Q 40/06 |
| | | | | 705/40 |
| 2008/0195534 | A1 | 8/2008 | Landis et al. | |
| 2009/0112744 | A1 | 4/2009 | Park et al. | |
| 2009/0164363 | A1 | 6/2009 | Ahlers et al. | |
| 2010/0268667 | A1* | 10/2010 | King | G06Q 40/04 |
| | | | | 705/37 |
| 2011/0055080 | A1 | 3/2011 | Ahlers et al. | |
| 2012/0011071 | A1 | 1/2012 | Pennock et al. | |
| 2012/0239552 | A1 | 9/2012 | Harycki | |
| 2013/0054484 | A1* | 2/2013 | Hoeflinger | G06Q 30/0273 |
| | | | | 705/329 |
| 2013/0204664 | A1* | 8/2013 | Romagnolo | G06Q 30/0203 |
| | | | | 705/7.32 |
| 2013/0226688 | A1* | 8/2013 | Harvilicz | G06Q 30/02 |
| | | | | 705/26.8 |
| 2014/0032298 | A1* | 1/2014 | Corrie | G06Q 30/0273 |
| | | | | 705/14.27 |
| 2014/0032307 | A1* | 1/2014 | Corrie | G06Q 30/0246 |
| | | | | 705/14.45 |
| 2014/0032308 | A1* | 1/2014 | Corrie | G06Q 30/0246 |
| | | | | 705/14.45 |
| 2014/0032309 | A1* | 1/2014 | Corrie | G06Q 30/0246 |
| | | | | 705/14.45 |
| 2014/0032310 | A1* | 1/2014 | Corrie | G06Q 30/0226 |
| | | | | 705/14.45 |
| 2014/0058804 | A1* | 2/2014 | Zhou | G06Q 30/02 |
| | | | | 705/300 |
| 2014/0143120 | A1* | 5/2014 | Clarke | G06Q 40/04 |
| | | | | 705/37 |
| 2014/0156433 | A1 | 6/2014 | Hills | |
| 2014/0164049 | A1* | 6/2014 | Yakos | G06Q 10/0633 |
| | | | | 705/7.27 |
| 2014/0164217 | A1 | 6/2014 | Hammock et al. | |
| 2014/0171039 | A1* | 6/2014 | Bjontegard | H04L 67/535 |
| | | | | 455/414.1 |
| 2014/0244486 | A1* | 8/2014 | Abril | G06Q 20/223 |
| | | | | 705/39 |
| 2014/0258094 | A1* | 9/2014 | Jouhikainen | G06Q 40/08 |
| | | | | 705/38 |
| 2014/0279682 | A1* | 9/2014 | Feldman | G06Q 40/06 |
| | | | | 705/36 R |
| 2014/0304137 | A1* | 10/2014 | Olson | G06Q 10/101 |
| | | | | 705/37 |
| 2014/0316823 | A1* | 10/2014 | Cooper | G06Q 40/08 |
| | | | | 705/4 |
| 2014/0351116 | A1* | 11/2014 | Hoff | G06Q 40/03 |
| | | | | 705/38 |
| 2014/0358766 | A1* | 12/2014 | Nayyar | G06Q 40/03 |
| | | | | 705/38 |
| 2015/0026035 | A1 | 1/2015 | Showalter | |
| 2015/0039490 | A1 | 2/2015 | Forrester et al. | |
| 2015/0088727 | A1* | 3/2015 | Goldblatt | G06Q 40/03 |
| | | | | 705/38 |
| 2015/0095210 | A1* | 4/2015 | Grech | G06Q 40/03 |
| | | | | 705/38 |
| 2015/0100475 | A1 | 4/2015 | Cummings et al. | |
| 2015/0168478 | A1 | 6/2015 | Öhlen et al. | |
| 2015/0278946 | A1 | 10/2015 | Don et al. | |
| 2015/0278947 | A1 | 10/2015 | Don et al. | |
| 2015/0278948 | A1 | 10/2015 | Don et al. | |
| 2015/0278949 | A1 | 10/2015 | Don et al. | |
| 2015/0332414 | A1 | 11/2015 | Unser et al. | |
| 2016/0110671 | A1* | 4/2016 | Ghosh | G06Q 10/06393 |
| | | | | 705/7.39 |
| 2016/0166689 | A1 | 6/2016 | Adler et al. | |
| 2016/0203551 | A1* | 7/2016 | Tutte | G06Q 40/03 |
| | | | | 705/38 |
| 2016/0225074 | A1 | 8/2016 | Xiao et al. | |
| 2020/0160369 | A1 | 5/2020 | Youakim et al. | |
| 2021/0012313 | A1 | 1/2021 | Don et al. | |
| 2021/0012343 | A1 | 1/2021 | Theodora et al. | |
| 2022/0301052 | A1 | 9/2022 | Boates et al. | |

OTHER PUBLICATIONS

Advisory Action dated Nov. 10, 2021, for U.S. Appl. No. 17/000,650, of Boates, B., et al., filed Aug. 24, 2020.

Non-Final Office Action dated Aug. 9, 2022, for U.S. Appl. No. 17/838,690, of Boates, B., et al., filed Jun. 13, 2022.

Non-Final Office Action dated Aug. 27, 2015, for U.S. Appl. No. 14/675,127, of Shearer, D.J., et al., filed Mar. 31, 2015.

Non-Final Office Action dated Jan. 21, 2016, for U.S. Appl. No. 14/675,257, of Shearer, D.J., et al., filed Mar. 31, 2015.

Final Office Action dated Mar. 31, 2016, for U.S. Appl. No. 14/675,127, of Shearer, D.J., et al., filed Mar. 31, 2015.

Non-Final Office Action dated Apr. 27, 2016, for U.S. Appl. No. 14/616,515, of Boates, B., et al., filed Feb. 6, 2015.

Final Office Action dated Oct. 7, 2016, for U.S. Appl. No. 14/675,257, of Shearer, D.J., et al., filed Mar. 31, 2015.

Non-Final Office Action dated Nov. 3, 2016, for U.S. Appl. No. 14/675,127, of Shearer, D.J., et al., filed Mar. 31, 2015.

Final Rejection dated Feb. 17, 2017, for U.S. Appl. No. 14/616,515, of Boates, B., et al., filed Feb. 6, 2015.

Non-Final Office Action dated Mar. 1, 2017, for U.S. Appl. No. 14/616,520, of Boates, B., et al., filed Feb. 6, 2015.

Final Office Action dated Apr. 10, 2017, for U.S. Appl. No. 14/675,127, of Shearer, D.J., et al., filed Mar. 31, 2015.

Notice of Allowance dated May 31, 2017, for U.S. Appl. No. 14/675,257, of Shearer, D.J., et al., filed Mar. 31, 2015.

Notice of Allowance dated Jul. 24, 2017, for U.S. Appl. No. 14/616,515, of Boates, B., et al., filed Feb. 6, 2015.

-inal Office Action dated Sep. 13, 2017, for U.S. Appl. No. 14/616,520, of Boates, B., et al., filed Feb. 6, 2015.

Notice of Allowance dated Sep. 20, 2017, for U.S. Appl. No. 14/675,127, of Shearer, D.J., et al., filed Mar. 31, 2015.

Non-Final Office Action dated Jul. 16, 2019, for U.S. Appl. No. 15/722,003, of Shearer, D.J., et al., filed Oct. 2, 2017.

Non-Final Office Action dated Oct. 4, 2019, for U.S. Appl. No. 15/798,868, of Boates, B., et al., filed Oct. 31, 2017.

(56) References Cited

OTHER PUBLICATIONS

Final Office Action dated Feb. 6, 2020, for U.S. Appl. No. 15/722,003, of Shearer, D.J., et al., filed Oct. 2, 2017.
Notice of Allowance dated Apr. 22, 2020, for U.S. Appl. No. 15/798,868, of Boates, B., et al., filed Oct. 31, 2017.
Notice of Allowance dated May 20, 2020, for U.S. Appl. No. 15/722,003, of Shearer, D.J., et al., filed Oct. 2, 2017.
Notice of Allowance dated Aug. 18, 2020, for U.S. Appl. No. 15/722,003, of Shearer, D.J., et al., filed Oct. 2, 2017.
Non-Final Office Action dated Feb. 3, 2021, for U.S. Appl. No. 17/000,650, of Boates, B., et al., filed Aug. 24, 2020.
Non-Final Office Action dated Apr. 5, 2022, for U.S. Appl. No. 17/000,650, of Boates, B., et al., filed Aug. 24, 2020.

* cited by examiner

600

```
┌─────────────────────────────────────────────────────┐
│ Receive a request from a first merchant to generate │
│               an invoice for a second merchant      │
│                          602                        │
└─────────────────────────────────────────────────────┘
                            │
                            ▼
┌─────────────────────────────────────────────────────┐
│ Calculate financing terms for payment of the invoice,│
│ wherein the financing terms include repayment terms │
│ designating a portion of each transaction processed │
│ by the payment processing system for the second     │
│ merchant to withhold for repayment of financing     │
│                 payment of the invoice              │
│                          604                        │
└─────────────────────────────────────────────────────┘
                            │
                            ▼
┌─────────────────────────────────────────────────────┐
│ Transmit the financing terms to the first and       │
│                    second merchant                  │
│                          606                        │
└─────────────────────────────────────────────────────┘
                            │
                            ▼
                  ╱╲
                 ╱  ╲
                ╱    ╲         No      ┌──────────┐
        Financing terms  ─────────────▶│  Return  │
         accepted? 608                 │   610    │
                ╲    ╱                 └──────────┘
                 ╲  ╱
                  ╲╱
                   │ Yes
                   ▼
┌─────────────────────────────────────────────────────┐
│ Transmit financing for payment of the invoice to    │
│                    the first merchant               │
│                          612                        │
└─────────────────────────────────────────────────────┘
                            │
                            ▼
┌─────────────────────────────────────────────────────┐
│ Withhold a portion of each transaction processed    │
│   for the second merchant for repayment of the      │
│                        financing                    │
│                          614                        │
└─────────────────────────────────────────────────────┘
```

702 Receive a request from a first merchant to generate an invoice for a second merchant

704 Calculate financing terms for payment of the invoice, wherein the financing terms include repayment terms designating a portion of each transaction processed by the payment processing system for the second merchant to withhold for payment of the invoice

706 Transmit the financing terms to the first and second merchant

708 Financing terms accepted? — No → 710 Return

Yes

712 Withhold for payment of the invoice, the portion of each transaction processed for the second merchant

714 Transfer the withheld portion of each transaction, processed for the second merchant, to the first merchant for payment of the invoice

Figure 7

INVOICE FINANCING AND REPAYMENT

CROSS-REFERENCE TO RELATED APPLICATION

This application is a continuation of, and claims priority to, U.S. patent application Ser. No. 15/722,003, filed Oct. 2, 2017, and issued as U.S. Pat. No. 10,872,362, which is a continuation of, and claims priority to, U.S. patent application Ser. No. 14/675,257, filed Mar. 31, 2015, and issued as U.S. Pat. No. 9,779,432, all of which are incorporated by reference herein.

BACKGROUND

Individuals and businesses often send invoices to other individuals or businesses for providing goods or services. When sending an invoice, an individual will typically include an invoice amount and a time period within which the invoice should be repaid (e.g., a term of repayment). Often, a discount may be offered to the invoice receiver for quick payment. However, it may be difficult for the invoice sender to determine an appropriate discount to offer to achieve the desired result.

Typically, the invoice receiver is required to pay the invoice amount within the term of repayment. In addition, discounts may be given to the invoice receiver for early payment. However, often times invoice receivers may not have enough cash on hand to pay a large invoice. Therefore, it may be difficult to repay the invoice in a timely manner or receive the additional benefit of discounts offered by the invoice sender.

BRIEF DESCRIPTION OF THE DRAWINGS

The techniques described herein are illustrated by way of example, and not by way of limitation, in the figures of the accompanying drawings, in which like reference numerals are used to refer to similar elements.

FIG. 6 is a flow diagram of an example process for offering financing to a merchant for payment of an invoice.

FIG. 7 is a flow diagram of an example process for facilitating financing for payment of an invoice.

Figure 1:
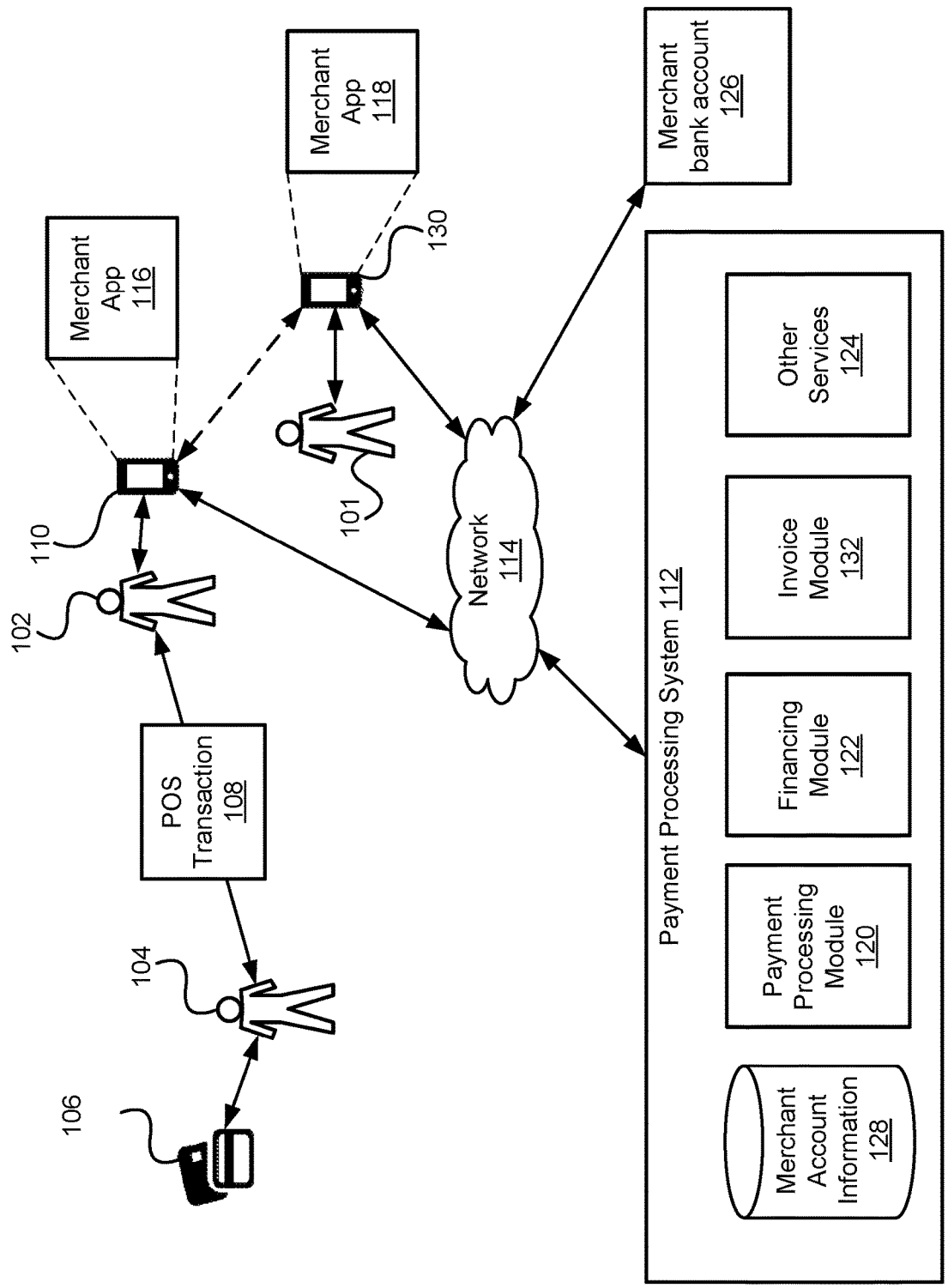
FIG. 1 illustrates an example architecture of a payment processing system including an invoice service.

The figures depict various embodiments of the techniques described herein for purposes of illustration only. It should be readily recognized from the following discussion that alternative embodiments of the structures and methods illustrated herein may be employed without departing from the principles of the techniques described herein.

DETAILED DESCRIPTION

Example embodiments described herein include techniques and hardware arrangements for offering and managing payment of invoices using a mobile point-of-sale terminal and determining financing options for a merchant receiving an invoice. More specifically, the techniques introduced herein include providing financing, e.g., cash advances, loans, or the like, to a merchant receiving an invoice.

For example, a first merchant may use an interface provided by the payment processing system to input information for an invoice to be sent to another person for goods or services used in running the merchant's business. The person receiving the invoice may be a second merchant that has an account with the payment processing service provider who operates the payment processing system. The payment processing system may take what is known from processing payments and providing other services to the second merchant to determine whether the second merchant qualifies for a financing offer to pay the invoice. A financing offer may include a cash advance, loan, or the like that is sent to the first merchant for payment of the invoice and the payment processing system withholds a portion of each transaction processed for the second merchant for repayment of the financing.

In another embodiment, the financing offer may include invoice payment terms that include the payment processing system withholding a portion of each transaction processed for the second merchant for payment of the invoice and transmitting the withheld portion to the first merchant. In both scenarios, the second merchant extends the time available for paying the invoice, which may give him a cash flow benefit. The first merchant can select which offer the second merchant receives. The benefit of the first type is that the first merchant receives prompt payment of the invoice and has cash on hand. The benefit of the second type may include an additional amount collected by the first merchant for payment of the invoice as a fee for taking payment over time.

The invoice and/or financing offers may be communicated between the merchants and the payment processing system using point-of-sale terminals associated with each of the merchants. The point-of-sale terminals generate interfaces used by the merchants for generating an invoice and interacting with a digital invoice to accept, reject, and/or request modification of financing terms.

In addition to determining financing offers to extend to the second merchant, the payment processing system may generate invoice terms for the first merchant. The first merchant identifies the importance of several factors, e.g., how quickly payment is needed, willingness to offer a discount, etc., and the payment processing system uses that information and other information known about the second merchant to generate invoice terms that best attain the first merchant's wants.

It will be recognized, that the techniques discussed herein can apply to various financing methods, such as cash advances and loans, although one or the other may be used for descriptive purposes in the examples below. The techniques disclosed herein, whether discussed in the examples as cash advance techniques or loan techniques, can be practiced with equal applicability as a cash advance or loan.

FIG. 1 illustrates an example architecture of a payment processing system 112 including an invoice service. In the example of FIG. 1, a buyer 104 may use any of a variety of payment cards 106 when participating in a point-of-sale (POS) transaction 108 with the merchant 102. In some embodiments, the payment cards may include one or more magnetic stripes for providing payment card and buyer information when swiped in a card reader. In other embodiments, other types of payment cards or methods may be used, for example smart cards having a built in integrated circuit including a memory chip or a radio frequency identification tag, a mobile communication device including a near field communication chip, and the like.

The system in the example of FIG. 1 illustrates a merchant device 110 associated with the merchant 102 and a merchant device 130 associated with the merchant 101 that participate in the payment processing service provided by a service provider. The merchant device 110 and the merchant device 130, as discussed elsewhere herein, may be any appropriate computing device configured to allow the merchant 102 and the merchant 101 to access the payment processing system 112 over the network 114. In some embodiments, the merchant devices 110 and 130 may be mobile computing device such as a smartphone or a tablet. In other embodiments, the merchant devices 110 and 130 may be a desktop computer, a laptop computer, a netbook, or other computing device.

In some embodiments, the merchant devices 110 and 130 may include instances of a merchant application 116 and 118 executed on the merchant devices 110 and 130, respectively. The merchant applications 116 and 118 may provide POS functionality to enable the merchants 101 and 102 to accept payments at a POS location using the merchant devices 130 and 110. The merchant application running on the merchant device may send transaction information via network 114 (e.g., the internet) to the payment processor system 112, e.g., as the transaction is being conducted at the POS location. The transaction information may include information regarding the time, place, and the amount of each respective transaction, information related to the item acquired, payment card information, as well as additional information, such as buyer information.

The payment processing system 112 enables a service provider to provide a payment service in which a merchants are able to conduct POS transactions 108 with buyers, such as for selling services and/or products to the buyers. The payment processing system 112 includes a payment processing module 120, financing module 122, invoice module 132, other services module 124, and merchant account information 128. The payment processing module 120 receives transaction information for processing payments made through a merchant application of a merchant device. For example, the payment processing module 120 may receive transaction information, including payment card information, from the merchant device 110 and verify that the payment card can be used to pay for the transaction, such as by contacting a card clearinghouse of a payment card network.

The financing module 122 includes software and/or logic for providing financing to a merchant 102 based on merchant account information. In some embodiments, the financing module 122 may provide financing to the merchant 101 for payment of the invoice as described in more detail below. The financing module 122 queries the merchant account information database 128 to retrieve attributes of the merchant account that may be used to determine whether the merchant 102 qualifies for financing (e.g., a cash advance). For example, merchant account attributes may include, the number of payments accepted by the merchant 102, the number of payment card swipes through a payment card reader, a payment card reader model, merchant bank account information, held funds associated with the merchant account, status of account set up, and the like.

Using the merchant account attributes, the financing module 122 determines an amount of financing the merchant 102 is eligible to receive for payment of the invoice. Additionally, the financing module 122 may determine a fee for the financing (e.g., a percentage of the financing or a fixed fee), a rate of repayment for the financing and the fee, a duration of repayment of the financing, and other terms of the financing. In some embodiments, the financing module 122 may determine that the merchant 102 qualifies up to a maximum amount of financing (e.g., the total amount of invoice). In such embodiments, the merchant 102 can request an amount of financing that is the same or less than the maximum amount of financing that the merchant 102 is eligible to receive. In some embodiments, the merchant 102 may request an amount of financing that is higher than the amount of financing that the merchant 102 was offered based on the merchant account context.

In one embodiment, to collect repayment from the merchant 102 for the financing amount (e.g., cash advance amount for payment of the invoice) and the fee associated with the financing amount, the financing module 122 may collect the total amount of financing and the fee from the merchant 102 by withholding a portion of the amounts collected by the merchant from future financial transactions conducted through the payment processing system 112. In some embodiments, the payment processing system 112 deducts a pre-determined portion or percentage from a total amount collected by the merchant 102 through financial transactions processed by the payment processing system 112 over a certain time period (e.g., hourly, daily, weekly, bi-weekly, monthly or yearly).

In some embodiments, the financing module 122 determines terms for payment of the invoice directly to merchant 101 from payments processed for merchant 102 by the payment processing system 112. For example, the merchant 101 may agree to receive payment of the invoice over a time period by receiving a portion of each transaction processed for the merchant 102. The financing module 122 may determine terms for payment of the invoice similar to determining terms for repayment of financing as described above. However, instead of transmitting the financing amount to the merchant 101 for payment of the invoice, the portion or percentage of transactions processed for the merchant 102 are transmitted to the merchant 101 for payment of the invoice over time. In one embodiment, the payment processing system 112 may withhold a pre-determined portion of each transaction processed for the merchant 102 and send the withheld portion to the merchant 101 for payment of the invoice. For example, the payment processing system may continue to withhold a portion of each transaction and transfer the withheld amount to the invoice sender (e.g., merchant 101) until the entire invoice amount is paid.

The invoice module 132 facilitates generation, transmission, and/or payment of invoices for merchants. For example, the merchant 101 requests that the invoice module 132 generate an invoice for merchant 102 via the merchant device 130. As described in more detail below, the merchant application 118 running on the merchant device 130 may present an interface for generating terms for an invoice. Further, the merchant 102 may receive the invoice via the merchant application 116 running on the merchant device 110.

The invoice module 132 includes software and/or logic for analyzing a plurality of signals generated from the other services 124 and the merchant account information database 128 to determine a terms for invoices. For example, the invoice module 132 may determine the invoice terms using one or more of the plurality of signals from the other services 124 and the merchant account information database 128. In some embodiments, such as that described in the example of FIG. 2, the invoice module may receive an input from the merchant 101 specifying a weight (e.g., user preference) for each of a plurality of factors before determining the terms.

The merchant account information database 128 securely stores merchant account information. In one embodiment, the merchant account information database 128 includes merchant name, contact information (e.g., telephone numbers, email address, the merchant's address and one or more financial accounts to which funds collected from buyers will be deposited), a transaction history for the merchant, and the like. Further, the merchant information database 128 may include a merchant profile created for each merchant.

The other services 124 include software and/or logic for providing other products and/or services to the merchant. The other products and/or services may include, for example, an inventory service, a payroll service, an appointment service, a feedback service, an analytics service, a pickup/delivery service, or the like. In some embodiments, the payment processing system 112 provides the invoice module 132 with signals from the other services 124 for the invoice module 132 to use in determining invoice terms. In other embodiments, the payment processing system 112 provides the financing module 122 with signals from the other services 124 for the financing module 122 to use in determining financing terms.

For example, the financing module 122 may receive signals from the feedback services indicating that the merchant 102 generally receives low feedback scores or has feedback scores that have been trending downward over a past time period. Based on those signals, the financing module 122 may determine that the merchant 102 will have lower than expected sales during a future time period and offer financing for payment of an invoice.

Alternatively, or in addition to the above examples, the payment processing system 112 may provide the financing module 122 and/or the invoice module 132 with a signal from the analytics service. The analytics service may provide advanced analytics on a merchant's past sales, one or more of the other signals discussed herein, and other information to determine future trends, and the like. The financing module 122 and the invoice module 132 may use the signals from the analytics service to generate invoice and/or financing terms.

Figure 2:
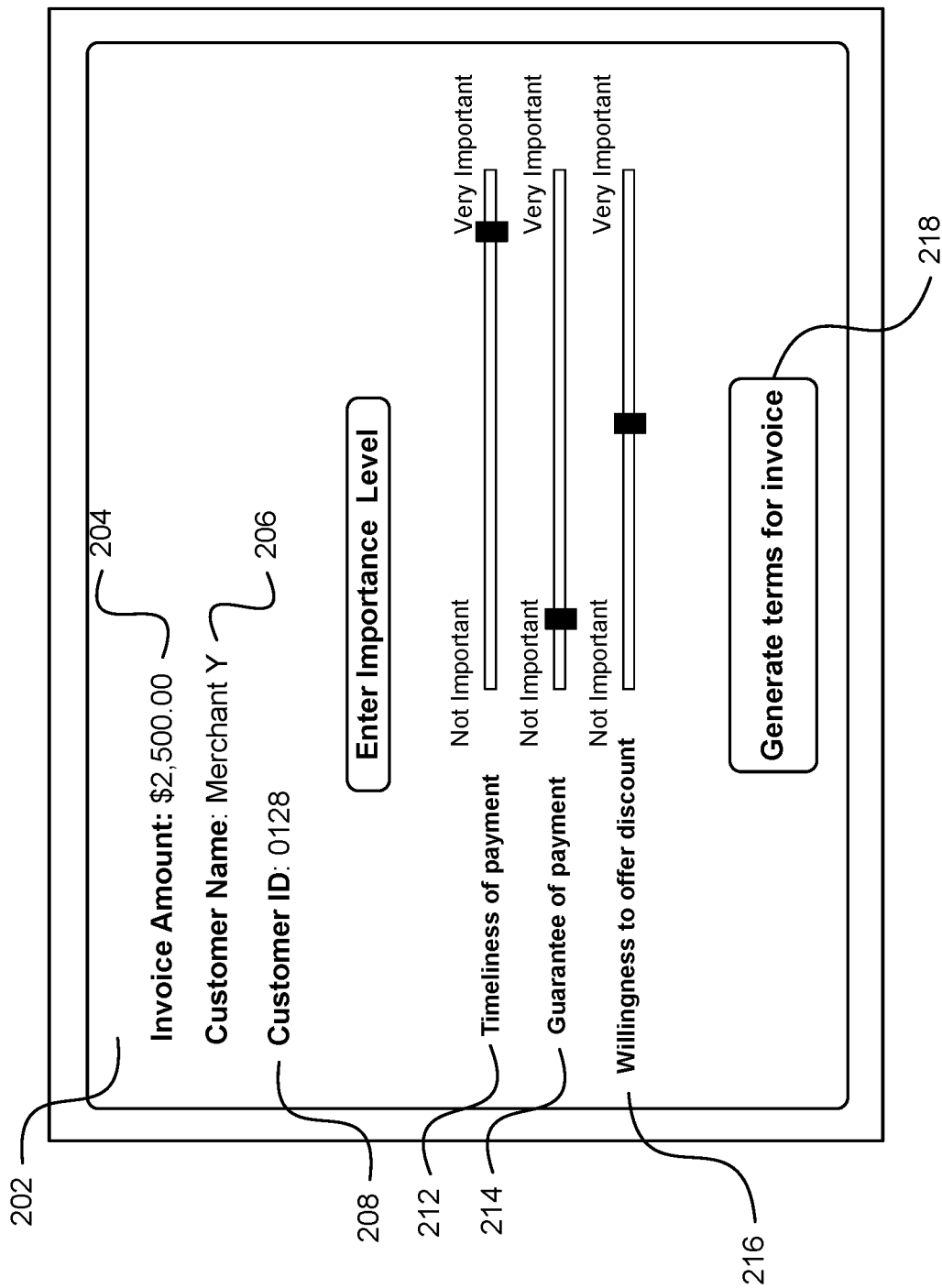
FIG. 2 illustrates an example graphic representation of a user interface for generating invoice terms for a merchant.

FIG. 2 illustrates an example graphic representation of a user interface 202 for generating invoice terms for a merchant. The interface 202 can be displayed on a display screen of a computing device (e.g., merchant device 130) that is being operated by a merchant ("Merchant X"). The computing device presents the interface 202 to the merchant 101 through an application, e.g., a web browser or a merchant application (e.g., merchant application 118), that is running on the computing device. For example, the interface 202 may be accessible to the merchant over the Internet and through a secure Uniform Resource Locator (URL). Similarly, the interface 202 may be accessible to the merchant through a software application, e.g., the merchant application 118 that is running on the merchant device 130.

As shown in the example of FIG. 2, the interface 202 displays information generated by the invoice module 132 regarding determination of terms for an invoice for the merchant 101. The merchant 101 may be instructed to enter an invoice amount 204, a customer name 206 ("Merchant Y") and a customer ID 208 ("0128"). The interface 202 displays a plurality of factors and slider bars associated with the plurality of factors. The plurality of factors may include, for example, timeliness of payment 212, guarantee of payment 214 and willingness to offer discount 216. The invoice sender may enter an importance level associated with each factor using the slider bars associated with the plurality of factors.

As described above, the invoice module 132 is configured to determine invoice terms by evaluating the importance levels entered by the merchant sending the invoice. Once the terms for the invoice are determined, the details of the terms may be displayed to the merchant, for example, via the merchant application 118 on the merchant device 130. After receiving the terms, the merchant can interact with the computing device, e.g., the merchant device 110, to access the interface 202 and learn more about the terms for the invoice.

Figure 3:
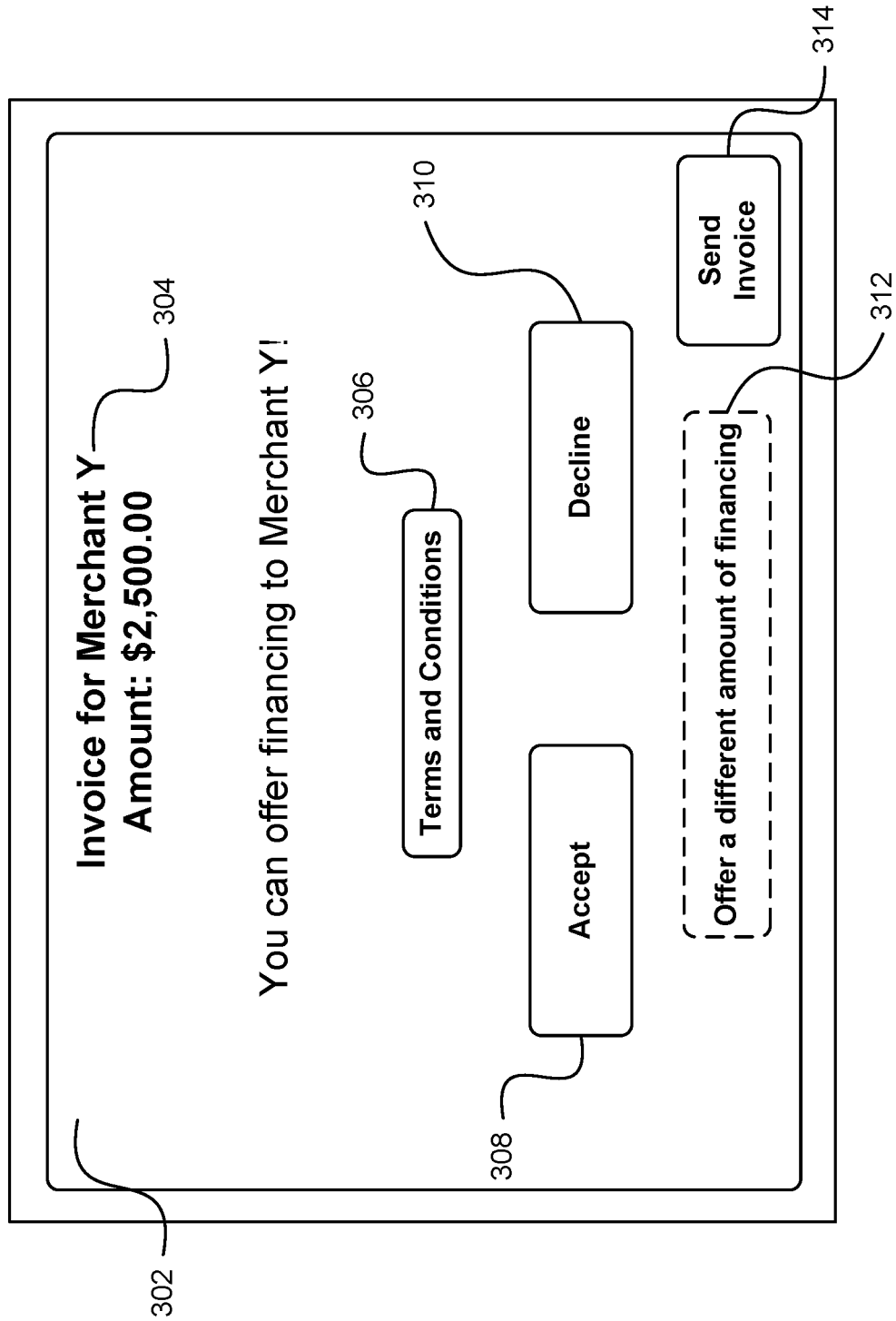
FIG. 3 illustrates an example graphic representation of a user interface for sending an invoice.

FIG. 3 illustrates an example graphic representation of a user interface 302 for sending an invoice. The interface 302 can be displayed on a display screen of a computing device (e.g., merchant device 130) that is being operated by a merchant ("Merchant X"). The computing device presents the interface 302 to the merchant 101. For example, the interface 302 may be accessible to the merchant over the Internet and through a secure Uniform Resource Locator (URL). Similarly, the interface 302 may be accessible to the merchant through a software application, e.g., the merchant application 118 that is running on the merchant device 130.

As depicted in the example of FIG. 3, the interface 302 displays information generated by the payment processing system 112 regarding sending an invoice to a second merchant (e.g., merchant 102). As described above, the financing module 122 is configured to determine whether the merchant receiving the invoice ("Merchant Y") is eligible for a financing. If the financing module 122 determines that the merchant 102 is eligible for financing, the interface 302 includes an option for the merchant 101 to offer financing to the merchant 102 receiving the invoice. The merchant 101 sending the invoice may interact with the computing device to access the interface 302 and learn more about the terms and conditions 306 before sending the invoice. In some embodiments, the merchant 101 sending the invoice, can select an option to accept the offer to provide financing to the merchant 102 receiving the invoice or select an option to decline the offer to provide financing to the merchant 102.

The merchant 101 sending the invoice may decide that financing of a different amount than the amount of the invoice is desired. In some embodiments, the interface 302 may include an option 312 to request a different amount of financing. In one embodiment, upon selecting the option 312 to request a different amount of financing, the merchant 101 sending the invoice may be allowed to input the desired amount of financing. The financing module 122 may provide adjusted terms and conditions for the different amount of financing that is requested by the merchant 101. The merchant 101 sending the invoice can send the invoice to the merchant 102 receiving the invoice by selecting the send invoice option 314.

Figure 4:
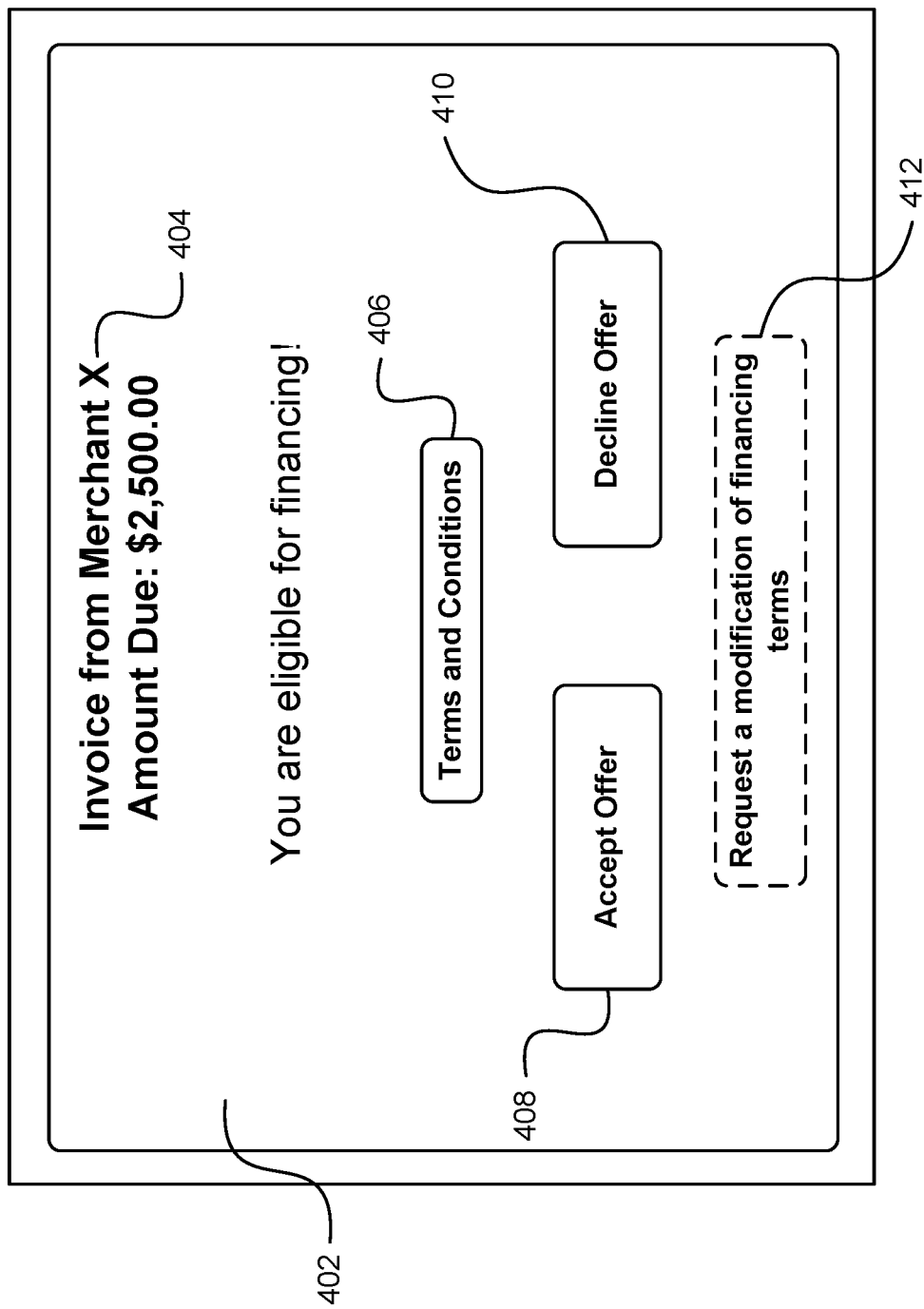
FIG. 4 illustrates an example graphic representation of an interactive digital invoice.

FIG. 4 illustrates an example graphic representation of an interactive digital invoice. The interface 402 can be displayed on a display screen of a computing device (e.g., merchant device 110) that is being operated by a merchant 102 receiving the invoice. The computing device presents the interface 402 to the merchant 102 through an application, for example, a web browser or a merchant application (e.g., merchant application 116), that is running on the computing device. For example, the interface 402 may be accessible to the merchant over the Internet and through a secure Uniform Resource Locator (URL). Similarly, the interface 402 may be accessible to the merchant through a software application, such as the merchant application 116 that is running on the merchant device 110.

As depicted in the example of FIG. 4, the interface 402 displays information generated by the payment processing system 112 regarding the invoice from the merchant 101. As described above, the financing module 122 is configured to determine whether the merchant 102 receiving the invoice qualifies for financing by evaluating various signals from the merchant account information database 128, signals from the other services 124 and input signals from the merchant 101 requesting the invoice. The details of the financing offer may be displayed to the merchant 102 receiving the invoice, for example via the merchant application 116 on the merchant device 110. The merchant 102 receiving the invoice may interact with the interface 402 to learn more about the terms and conditions of the financing offer by selecting the terms and conditions option 406.

As shown in the example of FIG. 4, the interface 402 provides the merchant receiving an invoice with information about the financing. In some embodiments, this information includes an amount of financing that the merchant is qualified to receive, a fee associated with the financing and the rate of repayment of the financing.

The merchant 102 receiving the invoice may decide that financing of a different amount than the amount due on the invoice is desired. In some embodiments, the interface 402 may include an option 412 to request a modification of financing terms. In one embodiment, upon selecting the option 412 to request a modification of financing terms, the merchant 102 receiving the invoice may be allowed to input the desired amount of financing. The payment processing system 112 may provide adjusted terms and conditions for a financing offer taking into account the requested terms.

Figure 5:
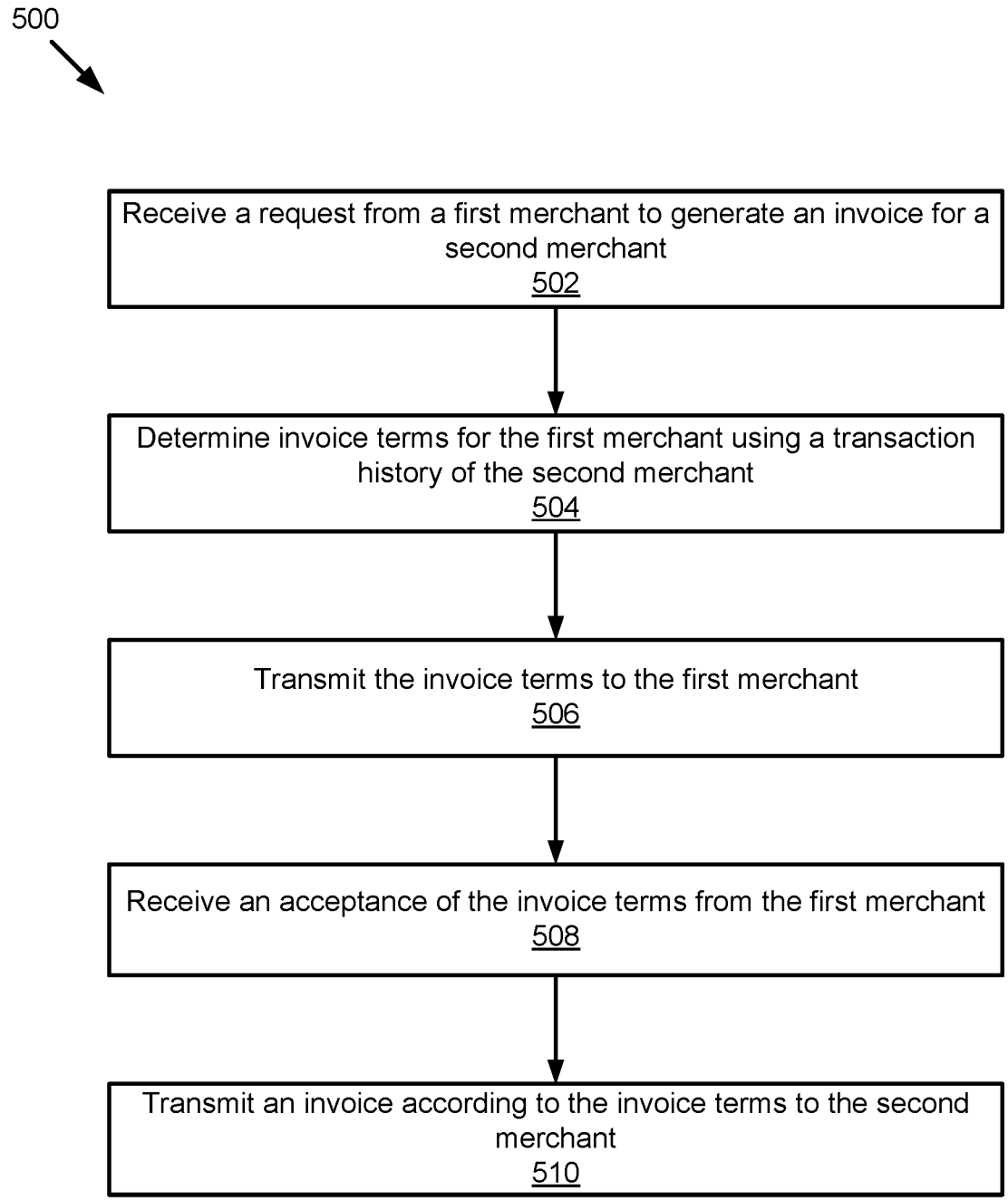
FIG. 5 is a flow diagram of an example process for generating terms of an invoice for a merchant.

FIG. 5 is a flow diagram of an example process 500 for generating terms of an invoice for a merchant. At 502, the invoice module 132 receives a request from a first merchant (e.g., merchant 101) to generate an invoice for a second merchant (e.g., merchant 102). In one embodiment, the invoice module 132 receives a request including a weight for a plurality of factors from the first merchant to generate the invoice for the second merchant. For example, as described elsewhere herein, the weight for the plurality of factors may indicate a level of importance for each factor from the first merchant. In some other embodiments, the invoice module 132 may receive from the first merchant a request including an invoice amount, a weight for each of a plurality of factors, and identifying information for the second merchant.

At 504, the invoice module 132 determines invoice terms for the first merchant (e.g., merchant 101) using a transaction history of the second merchant (e.g., merchant 102). For example, the invoice module 132 may access an invoice payment history for the merchant 102 to determine an average time period within which the merchant pays invoices. Using the transaction history for the merchant 102 and the weighted factors provided by the merchant 101, the invoice module 132 determines an invoice payment structure that is optimized for the merchant 101. For example, if the merchant 101 desires quick payment and the merchant 102 pays invoices, on average, after 30 days, the invoice module 132 may determine terms that offer a discount to the merchant 102 for payment before 30 days. Similarly, if the merchant 101 desires a greater amount of the invoice be paid, the invoice module 132 may generate invoice terms that do not include a discount for merchant 102. Thus, the invoice module 132 can balance the desires of the merchant 101 and generate invoice terms to achieve the best outcome for the merchant 101. If the invoice module 132 cannot access an invoice payment history for merchant 102 or the payment history is insufficient to determine invoice terms, the invoice module 132 may access payment histories of merchants similar to merchant 102 (e.g., based on location, business type, etc.) and extrapolate payment trends that can be used for generating invoice terms.

In addition to using a merchant's invoice payment or other account history, the invoice module 132 may determine the invoice terms using other signals from the other services 124 to determine terms for the merchant sending the invoice. The other services 124 may include an inventory service, a payroll service, an appointment service, a feedback service, an analytics service, a pickup/delivery service, or the like. For example, the invoice module 132 may receive a signal from an inventory service regarding the merchant's 101 inventory and, based on that signal, the invoice module 132 may determine that the merchant 101 will have low sales and is more likely to desire quick payment of the invoice.

At 506, the invoice module 132 transmits the invoice terms to the merchant 101, for example via the merchant device 130. For example, as described above with reference to FIG. 3, a merchant application 118 running on merchant device 130 may generate an interface for displaying the invoice terms to the merchant 101. In some embodiments, the merchant may choose to accept, decline, and/or request modification to the invoice terms. In another embodiment, the merchant 101 may resend the request to generate invoice terms by modifying the weights of the plurality of factors.

At 508, the invoice module 132 receives an acceptance of the invoice terms from the merchant 101. At 510, the invoice module 132 transmits an invoice according to the invoice terms to the merchant 102. In some embodiments, the invoice module 132 may transmit the invoice to a merchant application 116 running on merchant device 110. In other embodiments, the invoice may be delivered to the merchant 102 via a web interface, email, text message, or the like.

FIG. 6 is a flow diagram of an example process 600 for offering financing to a merchant for payment of an invoice. At 602, the payment processing system 112 receives a request from a first merchant (e.g., merchant 101) to generate an invoice for a second merchant (e.g., merchant 102). In one embodiment, the financing module 122 receives the request from the first merchant via merchant device 130 to generate an invoice for the second merchant. In another embodiment, the first merchant sends the request to the payment processing system 112 via a web interface.

At 604, the financing module 122 calculates financing terms for payment of the invoice. In one embodiment, the financing terms include repayment terms designating a portion of each transaction processed for the second merchant to withhold for repayment of the financing. In some embodiments, the financing terms are based on the invoice amount and a financial history of the second merchant.

At 606, the financing module 122 transmits the financing terms to the first merchant and the second merchant. In one embodiment, the financing terms are transmitted to the merchant 101 via the merchant device 130 and to the merchant 102 via the merchant device 110, for example via merchant application 118 and 116, respectively. In one embodiment, the first merchant may choose to decline the financing terms and request new financing terms before the payment processing system 112 sends the invoice to the second merchant. The merchant application 116 may then display the financing terms to the second merchant for acceptance. In some embodiments, the second merchant may choose to decline the financing terms and/or request a modification of the financing terms.

At 608, the financing module 122 determines whether the financing terms have been accepted by the first merchant and the second merchant. As described above, the second merchant may decline the financing terms and repay the invoice without financing.

At 610, the financing module 122 returns on determining that the financing terms were not accepted. In one embodiment, the financing module 122 may receive a request to recalculate the financing terms. In another embodiment, the first or second merchant may decline the financing terms and the process ends. For example, the second merchant may intend to pay the invoice with cash and/or credit from another source and refuse the financing offered by the payment processing system 112.

At 612, the payment processing system 112 transmits a cash advance, or some other form of financing, for payment of the invoice to the first merchant. In one embodiment, the amount of the cash advance is same as the invoice amount. In another embodiment, the second merchant may request a cash advance which is less than the invoice amount and the payment processing system 112 transmits the amount requested by the second merchant to the first merchant.

At 614, the payment processing module 120 withholds a portion of each transaction processed for the second merchant for repayment of the cash advance. In one embodiment, the payment processing module 120 may collect the total amount of financing and the fee from the merchant 102 by withholding a portion of the amounts collected by the merchant from future financial transactions conducted through the payment processing system 112. In some embodiments, the payment processing system 112 withholds a pre-determined portion or percentage from a total amount collected by the second merchant through financial transactions processed by the payment processing system 112 for the second merchant over a period of time (e.g., hourly, daily, weekly, bi-weekly, monthly, yearly, etc.).

FIG. 7 is a flow diagram of an example process 700 for facilitating financing for payment of an invoice. At 702, the payment processing system 112 receives a request from a first merchant (e.g., merchant 101) to generate an invoice for a second merchant (e.g., merchant 102). In one embodiment, the financing module 122 receives the request from the first merchant via merchant device 130 to generate an invoice for the second merchant. In another embodiment, the first merchant sends the request to the payment processing system 112 via a web interface.

At 704, the financing module 122 calculates financing terms for payment of the invoice. In one embodiment, the financing terms include repayment terms designating a portion of each transaction processed for the second merchant to withhold for payment of the invoice. In some embodiments, the financing terms are based on the invoice amount and a financial history of the second merchant At 706, the financing module 122 transmits the financing terms to the first merchant and the second merchant. In one embodiment, the financing terms are transmitted to the merchant 101 via the merchant device 130 and to the merchant 102 via the merchant device 110, for example via merchant application 118 and 116, respectively. In one embodiment, the first merchant may choose to decline the financing terms and request new financing terms before the payment processing system 112 sends the invoice to the second merchant. The merchant application 116 may then display the financing terms to the second merchant for acceptance. In some embodiments, the second merchant may choose to decline the financing terms and/or request a modification of the financing terms.

At 708, the financing module 122 determines whether the financing terms have been accepted by the first merchant and the second merchant. As described above, the second merchant may decline the financing terms and repay the invoice without financing.

At 710, the financing module 122 returns on determining that the financing terms were not accepted. In one embodiment, the financing module 122 may receive a request to recalculate the financing terms. In another embodiment, the first or second merchant may decline the financing terms and the process ends. For example, the second merchant may intend to pay the invoice with cash and/or credit from another source and refuse the financing offered by the payment processing system 112.

At 712, the payment processing module 120 withholds a portion of each transaction processed for the second merchant for payment of the invoice. In one embodiment, the payment processing module 120 may collect the total amount of the invoice and any additional fee from the second merchant by withholding a portion of the amounts collected by the second merchant from future financial transactions conducted through the payment processing system. In some embodiments, the payment processing system 112 withholds a pre-determined portion or percentage from a total amount collected by the second merchant through financial transactions processed by the payment processing system 112 for the second merchant over a period of time (e.g., hourly, daily, weekly, bi-weekly, monthly, yearly, etc.).

At 714, the payment processing system 112 transfers the withheld portion of each transaction processed for the second merchant to the first merchant for payment of the invoice and any fee. In one embodiment, the withheld amount is deposited by means of an electronic deposit to a financial account associated with the first merchant.

Figure 8:
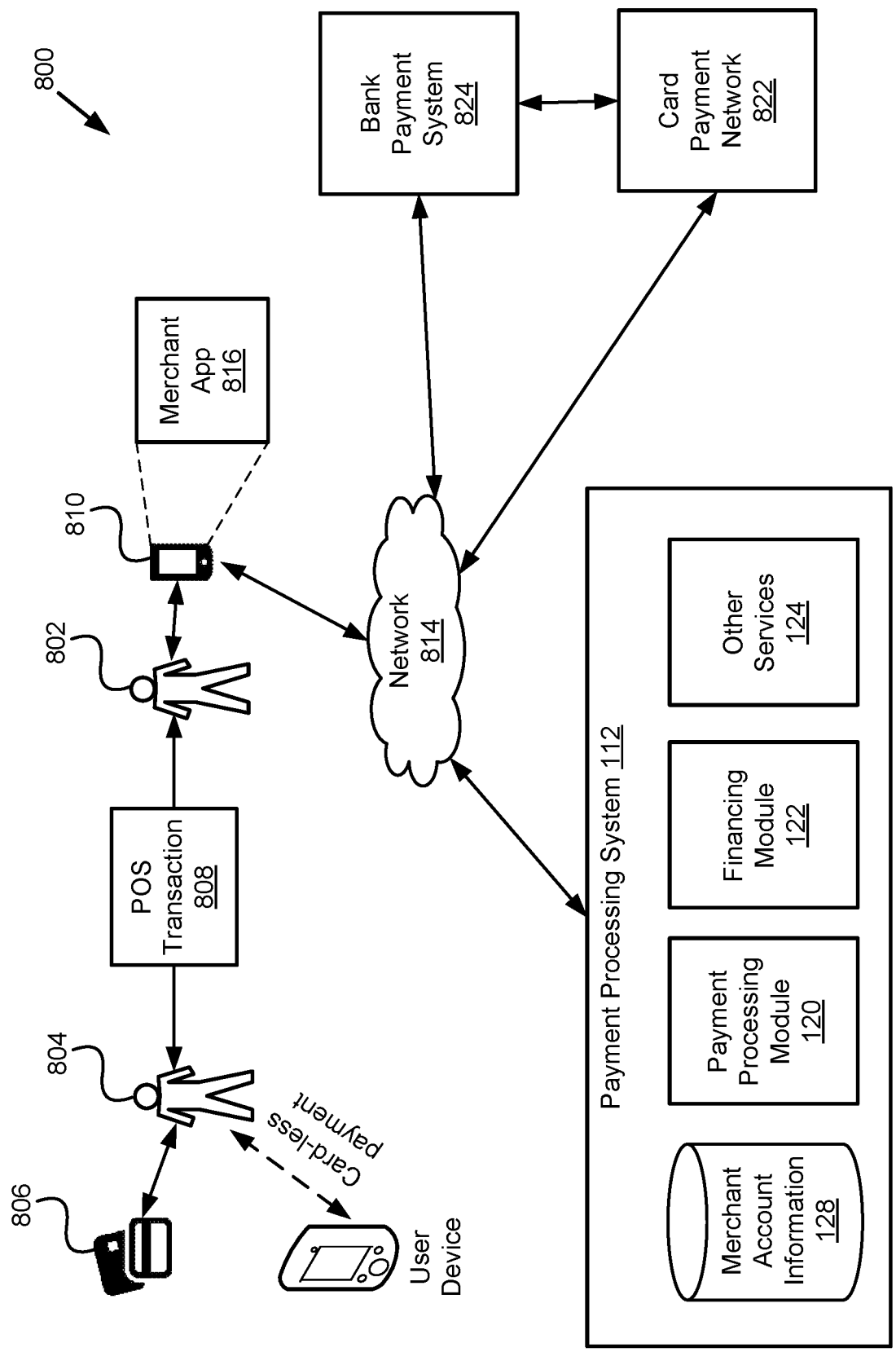
FIG. 8 illustrates an example architecture of a payment processing system environment.

FIG. 8 illustrates an example architecture of a payment processing system 800 for enabling transactions between merchants 802 and buyers 804. In the example of FIG. 8, a buyer 804 may use any of a variety of payment cards 806 when participating in a POS transaction 808 with a merchant 802. For example, a buyer 804 may typically have payment cards 806 such as credit cards, debit cards, prepaid cards, and the like, that the buyer 804 may use for conducting POS transaction 808. In some embodiments, the payment cards 806 may include one or more magnetic stripes for providing payment card and buyer information when swiped in a card reader. In other embodiments, other types of payment cards may be used, for example smart cards having a built-in integrated circuit including a memory chip, a radio frequency identification tag, and the like. In some embodiments, card-less payment methods may be used. For example, a virtual payment card may be stored on a user device such as a smart phone or other device and transmittable via near field communication or other suitable means.

The payment processing system 800 in the example of FIG. 8 illustrates a merchant device 810 associated with the merchant 802 that participates in the payment service provided by the service provider of the payment processing system 112. As discussed elsewhere herein, the merchant device 810 may be a computing device (e.g., a mobile computing device) able to communicate with the payment processing system 112, and with various other computing devices, through any suitable communication protocols, interfaces, and networks, including network 814. Further, the merchant device 810 may be any appropriate device operable to send and receive requests, messages, or other types of information over the network 814. Additionally, while only a single merchant device 810 is illustrated in the example of FIG. 8, there may be additional merchant devices depending on the number of merchants participating in the payment service.

Each merchant device 810 may include an instance of a merchant application 816 executed on the merchant device. The merchant application 816 may provide POS functionality to enable the merchant 802 to accept payments at a POS location using the merchant device 810. In some types of businesses, the POS location may correspond to a store or other place of business of the merchant 802, and thus, may be a fixed location that typically does not change on a day-to-day basis. In other types of businesses, however, the POS location may change from time to time, such as in the case that the merchant 802 operates a food truck, is a street vendor, a cab driver, or has an otherwise mobile business, e.g., in the case of merchants who sell items at buyers' homes, buyers' places of business, and so forth.

Accordingly, the merchant 802 and the buyer 804 may conduct a POS transaction 808 by which the buyer 804 acquires an item or service from the merchant 802 at a POS location. The merchant application 816 on the merchant device 810 may send transaction information to the payment processing system 112, for example, as the transaction is being conducted at the POS location. In some embodiments, such as if a particular merchant device 810 is not connected to the network 814 and is therefore processing transactions offline, the transaction information may be sent in a batch at a subsequent point in time or using other suitable techniques. In some embodiments, the transaction information may be sent via SMS, MMS, or a voice call over network 814 or various other networks.

The transaction information may include information regarding the time, place, and the amount of each respective transaction, information related to the item acquired, payment card information, as well as additional information, such as buyer information. For instance, the transaction information can include data stored in the payment card, e.g., magnetic stripe or integrated circuit data (cardholder name, card number, and other card information). In addition, when completing the transaction a buyer may sometimes provide a receipt email address for receiving a receipt through email. Other examples of transaction information that can be captured include detailed item information, e.g., an itemized listing of the items or services being acquired, the price being paid for each item or service, descriptors of the items or services (e.g., size, flavor, color, etc.), geolocation data indicating a geographic POS location of a particular transaction, online/offline card data, data describing the merchant, e.g., a merchant identifier, a merchant category code (MCC), any type of data that is received upon a buyer's authentication into a social network, if any, and various other types of information.

To accept electronic payments for POS transactions, the merchant 802 typically creates a merchant account on the payment processing system 112 by providing information describing the merchant including, for example, merchant name, contact information (e.g., telephone numbers, the merchant's address, and one or more financial accounts to which funds collected from buyers will be deposited). This merchant information can be securely stored by the service provider, for example, as merchant account information 128 in a secure database. Further, the merchant information may include a merchant profile created for each merchant. The merchant profile may include information about the merchant 802 and transaction information associated with transactions conducted by the merchant.

The payment processing system 112 enables a payment service provider to provide a payment service in which merchants 802 are able to conduct POS transactions 808 with a plurality of buyers 804, such as for selling services and/or products to the buyers 804. The payment processing system 112 may include one or more servers that are configured to process secure electronic financial transactions, for example, payment during a POS transaction 808, by communicating with the merchant device 810, card payment networks 822, and bank or other financial institution payment systems 824. The payment processor system 812 includes a payment processing module 120 that receives transaction information for processing payments made through the merchant application 816. For example, the payment processing module 120 may receive transaction information, such as an amount of the transaction, and may verify that a particular payment card 806 can be used to pay for the transaction, such as by contacting a card clearinghouse of a card payment network 822. Furthermore, in some examples, the payment processing module 120 may redirect payment information for transactions to be made using payment cards 806 to a bank payment system 824, or a payment system for some other financial institution. In other embodiments, the merchant device 810 may communicate directly with an appropriate card payment network 822 or bank payment system 824 for approving or denying a transaction using a particular payment card 806 for a POS transaction 808.

As introduced above, the payment processing system 112 may be configured to communicate with one or more systems of a card payment network 822 (e.g., MasterCard®, VISA®, or the like) over the network 814 to conduct financial transactions electronically. The payment processing system 112 may also communicate with one or more bank payment systems 824 of one or more banks, or other financial institutions, over the network 814. For example, the payment processing system 112 may communicate with an acquiring bank, a payment card issuing bank, and/or a bank maintaining buyer accounts for electronic payments.

A payment card acquiring bank may be a registered member of a card association (e.g., Visa®, MasterCard®, or the like), and may be part of a card payment network 822. A payment card issuing bank may issue payment cards 806 to buyers 804, and may pay acquiring banks for purchases made by cardholders to which the issuing bank has issued a payment card 806. Accordingly, in some embodiments, the systems of an acquiring bank may be included in the card payment network 822 and may communicate with systems of a payment card issuing bank to obtain payment. Further, in some embodiments, bank payment systems 824 may include systems associated with debit card issuing institutions, in which case, the systems of the debit card issuing institution may receive communications regarding a transaction in which the buyer uses a debit card instead of a credit card. Additionally, there may be systems of other financial institutions involved in some types of transactions or in alternative system architectures, and thus, the foregoing are merely several examples.

The payment processing system 112 includes a financing module 122, other services 124, and a merchant account information database 128 for determining a financing for a merchant receiving an invoice as described elsewhere herein.

The network 814 can be a conventional type, wired or wireless, and may have numerous different configurations including a star configuration, token ring configuration, or other configurations. Furthermore, the network 814 may include a local area network (LAN), a wide area network (WAN) (e.g., the internet), and/or other interconnected data paths across which multiple devices may communicate. In some embodiments, the network 814 may be a peer-to-peer network. The network 814 may also be coupled with or include portions of a telecommunications network for sending data using a variety of different communication protocols. In some embodiments, the network 814 may include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 8 illustrates one network 814 coupled to the merchant device, payment processor system, card payment network, and bank, in practice one or more networks 814 can connect these entities.

Figure 9:
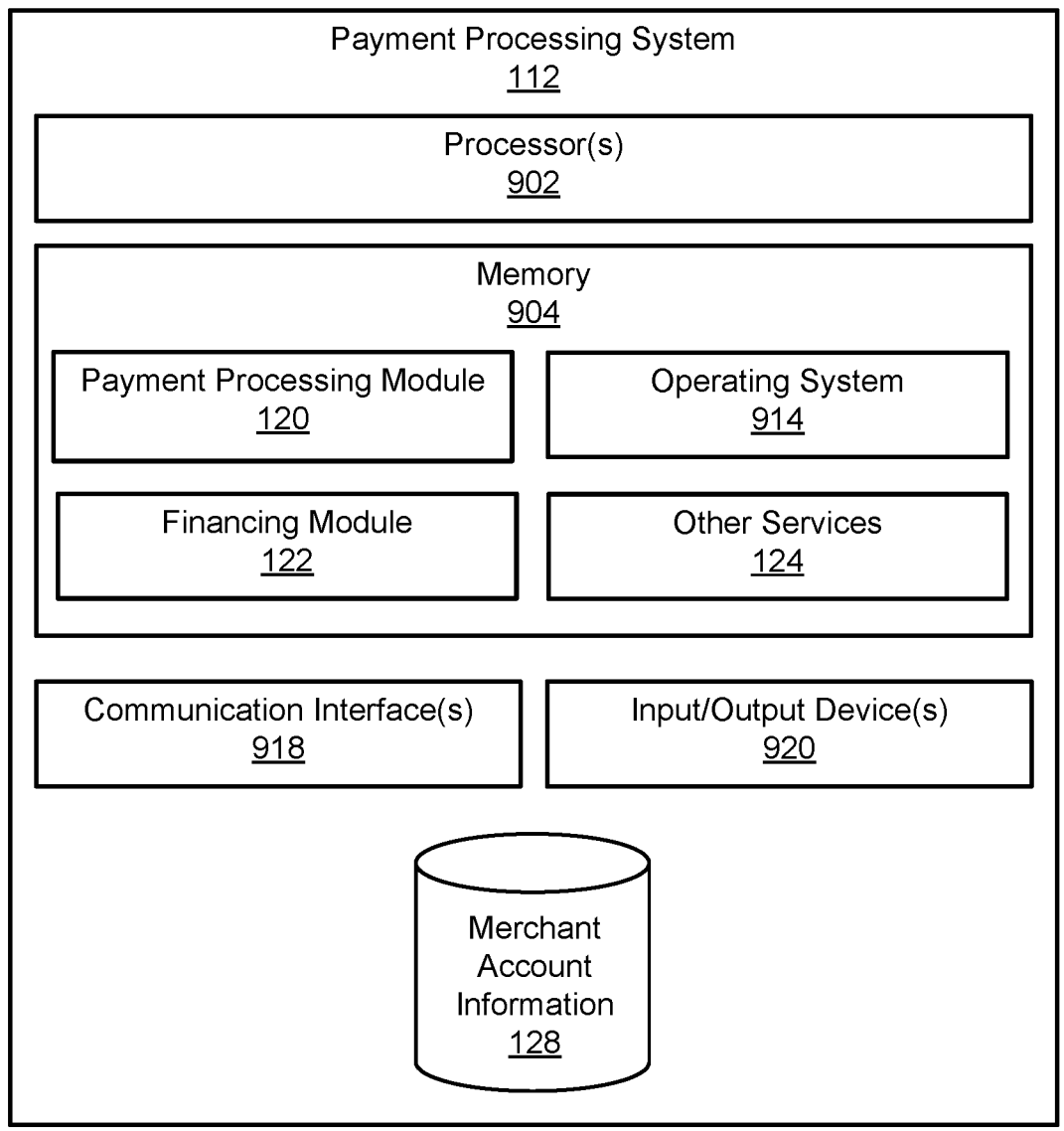
FIG. 9 is a block diagram illustrating select components of an example payment processing system according to some embodiments.

FIG. 9 is a block diagram illustrating select components of an example payment processing system 112 according to some embodiments. The payment processing system 112 may be any suitable type of computing device capable of sending communications and performing the functions according to the techniques described herein and may be operated by a service provider that provides the payment service. For instance, in the case of a server providing the payment processing system 112, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the examples herein illustrate the components and data of the payment processing system 112 as being present in a single location, these components and data may alternatively be distributed across different computing devices and different locations. Consequently, the functions may be implemented by one or more computing devices, with the various functionality described above distributed in various ways across the different computing devices, to collectively implement the payment processing system 112. Multiple payment processing systems 112 may be located together or separately, and organized, for example, as virtual servers, server banks and/or server farms. The described functionality may be provided by the servers of a single entity or enterprise, or may be provided by the servers and/or services of multiple different buyers or enterprises.

In the example of FIG. 9, the payment processing system 112 includes one or more processors 902, one or more memory devices 904, one or more communication interfaces 918, and one or more input/output devices 920. Additionally, the payment processing system 112 may include data stores, such as merchant account information 128. These components may be similar to those described above with reference to FIG. 8 and elsewhere herein.

The memory 904 may be used to store and maintain any number of functional components or modules that are executable by the processor 902. In some embodiments, these functional components comprise instructions or programs that are executable by the processor 902 and that, when executed, implement operational logic for performing the actions and services attributed above to the payment processing system 112. Functional components of the payment processing system 112 stored in the memory 904 may include the payment processing module 120, financing module 122, and other services 124. These components may be similar to those describe above with reference to FIG. 8 and elsewhere herein. Additional functional components may include an operating system 914 for controlling and managing various functions of the payment processing system 112 and for enabling basic user interactions with the payment processing system 112. In addition, the memory 904 may store data used for performing the operations described herein. Further, the payment processing system 112 may include many other logical, programmatic and physical components, of which those described above are merely examples that are related to the discussion herein.

Figure 10:
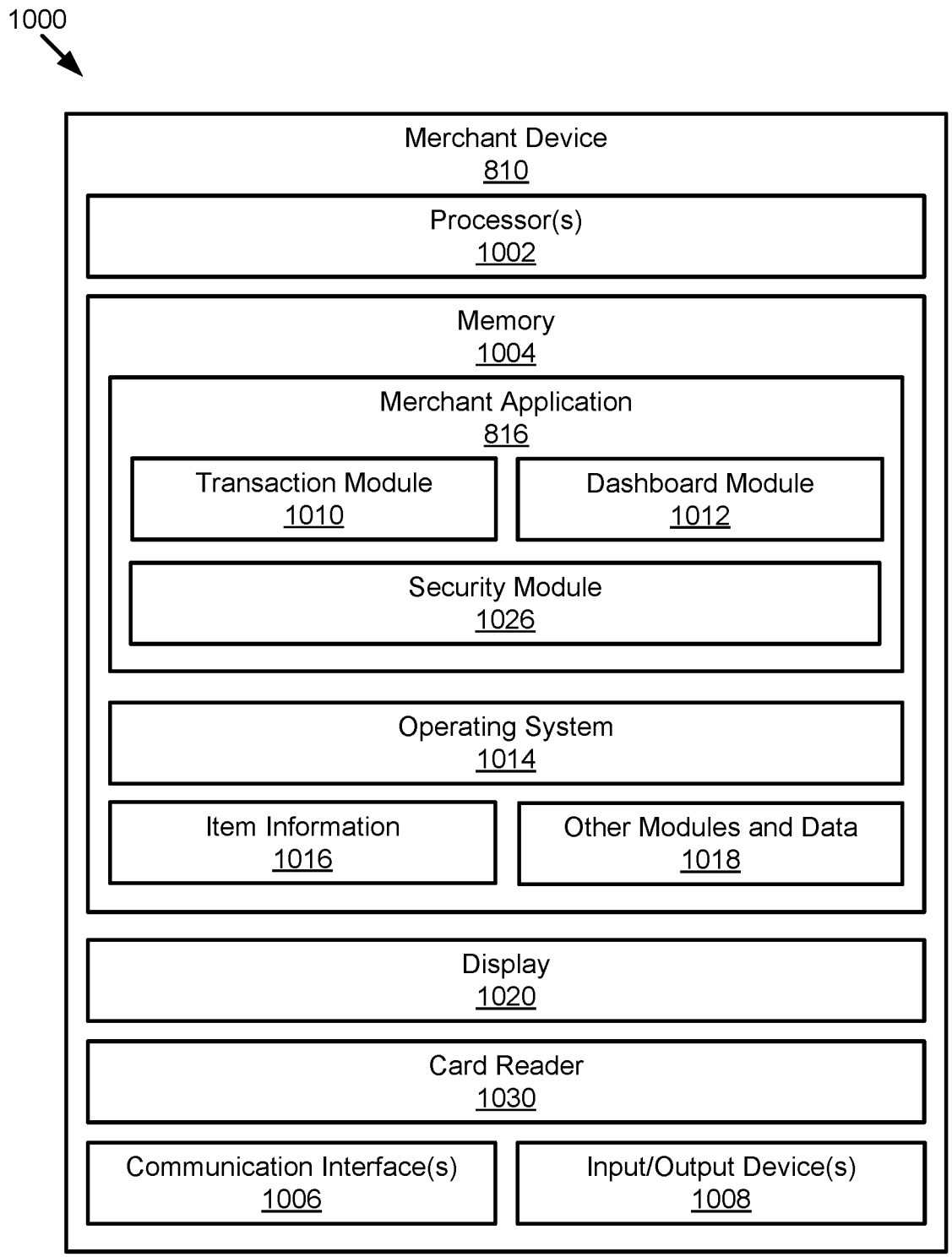
FIG. 10 is a block diagram illustrating select components of an example merchant device according to some embodiments.

FIG. 10 is a block diagram illustrating select components of an example merchant device 810 according to some embodiments. The merchant device 810 may be any suitable type of computing device, for example, portable, semi-portable, semi-stationary, or stationary. Some examples of the merchant device 810 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body mounted computing devices; augmented reality devices; or other computing devices capable of sending communications and performing the functions according to the techniques described herein.

In the example of FIG. 10, the merchant device 810 includes at least one processor 1002, a memory 1004, one or more communication interfaces 1006, and one or more input/output (I/O) devices 1008. Each processor 1002 may itself comprise one or more processors or processing cores. For example, the processor 1002 can be implemented as one or more microprocessors, microcomputers, microcontrollers, digital signal processors, central processing units, state machines, logic circuitries, and/or any devices that manipulate signals based on operational instructions. In some embodiments, the processor 1002 may be one or more hardware processors and/or logic circuits of any suitable type specifically programmed or configured to execute the algorithms and processes described herein by performing various input/output, logical, and/or mathematical operations. The processor 1002 can be configured to fetch and execute computer-readable processor-executable instructions stored in the memory 1004.

Depending on the configuration of the merchant device 810, the memory 1004 may be an example of tangible, non-transitory computer storage media and may include volatile and nonvolatile memory and/or removable and non-removable media implemented in any type of technology for storage of information such as computer-readable processor-executable instructions, data structures, program modules or other data. The memory 1004 may include, but is not limited to, RAM, ROM, EEPROM, flash memory, solid-state storage, magnetic disk storage, optical storage, and/or other computer-readable media technology. Further, in some cases, the merchant device 810 may access external storage, such as RAID storage systems, storage arrays, network attached storage, storage area networks, cloud storage, or any other medium that can be used to store information and that can be accessed by the processor 1002 directly or through another computing device or network. Accordingly, the memory 1004 may be computer storage media able to store instructions, modules or components that may be executed by the processor 1002.

The memory 1004 may be used to store and maintain any number of functional components or modules that are executable by the processor 1002. In some embodiments, these functional components comprise instructions or programs that are executable by the processor 1002 and that, when executed, implement operational logic for performing the actions and services attributed above to the merchant device 810. Functional components of the merchant device 810 stored in the memory 1004 may include the merchant application 816. In this example, the merchant application 816 includes a transaction module 1010, a dashboard module 1012, and a security module 1026. The transaction module 1010, for example, presents an interface, such as a payment interface to enable the merchant to conduct transactions, receive payments, and so forth, as well as for communicating with the payment processing system 112 for processing payments and sending transaction information. The dashboard module 1012 enables the merchant to manage the merchant's account, the merchant profile, merchant preferences, view saved or new pricing information, generate, view, and/or pay invoices, accept or reject financing for invoices, and the like. The security module 1026 may, as described herein, enable the merchant application 816 to encrypt and decrypt transaction information communicated between the merchant device 810 and other system components. Additional functional components may include an operating system 1014 for controlling and managing various functions of the merchant device 810 and for enabling basic user interactions with the merchant device 810.

In addition, the memory 1004 may also store data, data structures and the like, that are used by the functional components. For example, data stored by the memory 1004 may include item information 1016 that includes information about the items offered by the merchant, which may include a list of items currently available from the merchant, images of the items, descriptions of the items, prices of the items, and so forth. For instance, when the merchant 802 is setting up the merchant application 816 to accept payments for particular items offered by the merchant 802, the merchant may enter the item information 1016 for the particular items. Depending on the type of the merchant device 810, the memory 1004 may also optionally include other functional components and data, such as other modules and data 1018, which may include programs, drivers, etc., and the data used or generated by the functional components. Further, the merchant device 810 may include many other logical, programmatic and physical components, of which those described are merely examples that are related to the discussion herein.

The communication interface(s) 1006 may include one or more interfaces and hardware components for enabling communication with various other devices, such as over the network(s) 814 or directly. For example, communication interface(s) 1006 may enable communication through one or more of the internet, cable networks, wireless networks (e.g., Wi-Fi) and wired networks, as well as close-range communications such as Bluetooth®, Bluetooth® low energy, and the like, as additionally enumerated elsewhere herein.

In another embodiment, the communication interface(s) 1006 may include a cellular communications transceiver for sending and receiving data over a cellular communications network such as via voice call, short messaging service (SMS), multimedia messaging service (MMS), hypertext transfer protocol (HTTP), direct data connection, WAP, e-mail or another suitable type of electronic communication. The communication interface(s) 1006 also provides other conventional connections to the network 814 for distribution of files and/or media objects using standard network protocols such as TCP/IP, HTTP, HTTPS and SMTP as will be understood.

The merchant device 810 may further include a display 1020, which may employ any suitable display technology. For example, the display 1020 may be a liquid crystal display, a plasma display, a light emitting diode display, an OLED (organic light-emitting diode) display, an electronic paper display, or any other suitable type of display able to present digital content thereon. In some embodiments, the display 1020 may have a touch sensor associated with the display 1020 to provide a touchscreen display configured to receive touch inputs for enabling interaction with a graphical user interface presented on the display 1020. Accordingly, embodiments described herein are not limited to any particular display technology.

The merchant device 810 may further include one or more I/O devices 1008. The I/O devices 1008 may include speakers, a microphone, a camera, and various user controls (e.g., buttons, a joystick, a keyboard, a keypad, etc.), a haptic output device, and so forth.

In addition, the merchant device 810 may include or may be connectable to a payment card reader 1030. In some embodiments, the payment card reader 1030 may plug in to a port in the merchant device, such as a microphone/headphone port. In other embodiments, the mobile device interface may include other physical connectors, standardized or proprietary, for coupling the payment card reader 1030 with the merchant device 810. In yet other embodiments, the payment card reader 1030 may use a low power wireless communication interface (e.g., Bluetooth, Bluetooth Low Energy, Zigbee, or the like) to communicatively couple the payment card reader 1030 with the merchant device 810 without a physical connection. The payment card reader 1030 may include a card interface for reading a magnetic stripe or an integrated circuit of a payment card 806, and further may include encryption hardware and/or logic for encrypting the information read from the payment card 806. Alternatively, numerous other types of payment card or payment instrument readers 1030 may be employed with the merchant devices 810 herein, depending on the type and configuration of the merchant device 810.

As used here, the term "payment card" or "payment instrument" refers to a payment mechanism which includes a debit card, a conventional credit card, "smartcards" that have embedded integrated circuit chips (e.g., Europay-MasterCard-Visa (EMV) cards), or any wallet-size card which functions as a combination of any of these payment mechanisms. In some embodiments, a payment card or payment instrument may also include a virtual payment card stored on a device such as a smart phone or other device and transmittable, for example, via near field communication or other suitable means.

Other components included in the merchant device 810 may include various types of sensors (not shown), which may include a GPS device, an accelerometer, gyroscope, compass, proximity sensor, and the like. Additionally, the merchant device 810 may include various other components that are not shown, examples of which include removable storage, a power source, such as a battery and power control unit, and so forth.

A payment communication system using a payment card reader has been described. In the above description, for purposes of explanation, numerous specific details are set forth in order to provide a thorough understanding of the techniques introduced herein. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the techniques may be implemented using any type of computing system that can receive data and commands, and present information as part of any peripheral device providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Furthermore, the techniques introduce herein can be embodied in the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Finally, the algorithms presented herein are not inherently related to any particular computer or other apparatus. Various general-purpose systems may be used with programs in accordance with the teachings herein, or it may prove convenient to construct more specialized apparatus to perform the required method steps. In addition, the techniques introduced herein are not described with reference to any particular programming language. It will be appreciated that a variety of programming languages may be used to implement the techniques as described herein.

The foregoing description of the embodiments has been presented for the purposes of illustration and description. It is not intended to be exhaustive or to limit the techniques to the precise form disclosed. Many modifications and variations are possible in light of the above teaching. It is not intended that the scope of the embodiments be limited by this detailed description, but rather by the claims of this application. As will be understood by those familiar with the art, the examples described herein may be embodied in other specific forms without departing from the spirit or essential characteristics thereof. Likewise, the particular naming and division of the modules, routines, features, attributes, methodologies and other aspects are not mandatory or significant, and the mechanisms that implement the techniques or features may have different names, divisions and/or formats.

Furthermore, as will be apparent to one of ordinary skill in the relevant art, the modules, routines, features, attributes, methodologies and other aspects of the techniques can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, or similar components known to those of ordinary skill in the art of computer programming. Additionally, the techniques are in no way limited to implementation in any specific programming language, or for any specific operating system or environment. Accordingly, the detailed description is intended to be illustrative, but not limiting, of the scope of the claims, which are set forth below.

What is claimed is:

1. A computer-implemented method comprising:
receiving, by a payment processing system, transaction information of transactions performed between a plurality of merchants and a plurality of buyers, wherein a respective computing device is associated with each respective merchant of the plurality of merchants, wherein an application executable on the respective computing device configures the respective computing device as a POS terminal configured to send the transaction information to the payment processing system, wherein the payment processing system is configured to process payments between the plurality of merchants and the plurality of buyers;
receiving, by the payment processing system, an indication of an invoice generated by a merchant and payable by a purchasing entity;

determining, by the payment processing system, terms for the merchant to finance at least part of an amount of the invoice for the purchasing entity, wherein the terms are based on at least one of:
- (a) at least a portion of the transaction information received from a computing device associated with the merchant and configured by the application as a POS terminal;
- (b) at least a portion of the transaction information associated with at least one other purchasing entity determined to be related to the purchasing entity based on at least one of: a geographic location related to the purchasing entity, or a business type related to the purchasing entity; or
- (c) at least a portion of the transaction information associated with the purchasing entity;

transmitting, by the payment processing system, the terms to the merchant;

based at least on receiving, by the payment processing system, an acceptance of the terms from the merchant to finance at least the part of the amount of the invoice, transmitting the terms to the purchasing entity; and based at least on receiving an acceptance of the terms from the purchasing entity, providing, by the payment processing system, and to the merchant for payment of at least the part of the amount of the invoice, funds subsequently collected from the purchasing entity.

2. The computer-implemented method of claim 1, wherein the purchasing entity is one of the plurality of merchants, the operations further comprising withholding a portion of funds from future transactions conducted via the respective computing device associated with the purchasing entity for subsequently collecting the funds from the purchasing entity.

3. The computer-implemented method of claim 1, wherein:
- the amount of the invoice is for an amount owed by the purchasing entity to the merchant; and
- the operations further comprise determining the terms for the merchant using a plurality of weights received from the merchant, the plurality of weights indicating importance of a plurality of factors for determining invoice terms.

4. The computer-implemented method of claim 3, wherein the plurality of weights comprise:
- a first weight indicating importance of quick repayment; and
- a second weight indicating importance of full repayment.

5. The computer-implemented method of claim 1, the operations further comprising determining the terms for the merchant based on one or more additional signals received from one or more additional services, respectively, comprising at least one of an inventory service, a payroll service, an appointment service, a feedback service, or a pickup/delivery service.

6. The computer-implemented method of claim 1, wherein:
- the invoice is for an amount owed by the purchasing entity to the merchant; and
- the payment processing system is further configured to determine the terms for the merchant based on at least the portion of the transaction information associated with the purchasing entity that includes a transaction history of a plurality of transactions conducted by the purchasing entity.

7. The computer-implemented method of claim 1, wherein the terms for the merchant are based in part on an invoice payment history of other invoices by a plurality of other purchasing entities that are located geographically proximate to the purchasing entity.

8. A system comprising:
one or more processors of a payment processing system configured by executable instructions to perform operations comprising:
- receiving transaction information of transactions performed between a plurality of merchants and a plurality of buyers, wherein a respective computing device is associated with each respective merchant of the plurality of merchants, wherein an application executable on the respective computing device configures the respective computing device as a POS terminal configured to send the transaction information to the payment processing system, wherein the payment processing system is configured to process payments between the plurality of merchants and the plurality of buyers;
- receiving an indication of an invoice generated by a first merchant and payable by a purchasing entity;
- determining terms for the merchant to finance at least part of an amount of the invoice for the purchasing entity, wherein the terms are based on at least one of:
  - (a) at least a portion of the transaction information received from a computing device associated with the merchant and configured by the application as a POS terminal;
  - (b) at least a portion of the transaction information of at least one related merchant determined based on at least one of: a geographic location related to the purchasing entity, or a business type related to the purchasing entity; or
  - (c) at least a portion of the transaction information associated with the purchasing entity;
- transmitting the terms to the merchant;
- based at least on receiving an acceptance of the terms from the merchant to finance at least the part of the amount of the invoice, transmitting the terms to the purchasing entity; and
- based at least on receiving an acceptance of the terms from the purchasing entity, providing, to the merchant and for payment of at least the part of the amount of the invoice, funds subsequently collected from the purchasing entity.

9. The system as recited in claim 8, wherein the purchasing entity is one of the plurality of merchants, the operations further comprising withholding a portion of funds from future transactions conducted via the respective computing device associated with the purchasing entity for subsequently collecting the funds from the purchasing entity.

10. The system as recited in claim 8, wherein:
- the amount of the invoice is for an amount owed by the purchasing entity to the merchant; and
- the operations further comprise determining the terms for the merchant using a plurality of weights received from the merchant, the plurality of weights indicating importance of a plurality of factors for determining invoice terms.

11. The system as recited in claim 10, wherein the plurality of weights comprise:
- a first weight indicating importance of quick repayment; and
- a second weight indicating importance of full repayment.

12. The system as recited in claim 8, the operations further comprising determining the terms for the merchant based on one or more additional signals received from one or more additional services, respectively, comprising at least one of an inventory service, a payroll service, an appointment service, a feedback service, or a pickup/delivery service.

13. The system as recited in claim 8, wherein:
   the invoice is for an amount owed by the purchasing entity to the merchant; and
   the payment processing system is further configured to determine the terms for the merchant based on at least the portion of the transaction information associated with the purchasing entity that includes a transaction history of a plurality of transactions conducted by the purchasing entity.

14. The system as recited in claim 8, wherein the terms for the merchant are based in part on an invoice payment history of other invoices by a plurality of other purchasing entities that are located geographically proximate to the purchasing entity.

15. One or more non-transitory computer-readable media storing instructions that, when executed by one or more processors of a payment processing system, configure the one or more processor to perform operations comprising:
   receiving transaction information of transactions performed between a plurality of merchants and a plurality of buyers, wherein a respective computing device is associated with each respective merchant of the plurality of merchants, wherein an application executable on the respective computing device configures the respective computing device as a POS terminal configured to send the transaction information to the payment processing system, wherein the payment processing system is configured to process payments between the plurality of merchants and the plurality of buyers;
   receiving an indication of an invoice generated by a merchant and payable by a purchasing entity;
   determining terms for the merchant to finance at least part of an amount of the invoice for the purchasing entity, wherein the terms are based on at least one of:
   (a) at least a portion of the transaction information received from a computing device associated with the merchant and configured by the application as a POS terminal;
   (b) at least a portion of the transaction information associated with at least one other purchasing entity determined to be related to the purchasing entity based on at least one of: a geographic location related to the purchasing entity, or a business type related to the purchasing entity; or
   (c) at least a portion of the transaction information associated with the purchasing entity;
   transmitting the terms to the merchant;
   based at least on receiving an acceptance of the terms from the merchant to finance at least the part of the amount of the invoice, transmitting the terms to the purchasing entity; and
   based at least on receiving an acceptance of the terms from the purchasing entity, providing, to the merchant for payment of at least the part of the amount of the invoice, funds subsequently collected from the purchasing entity.

16. The one or more non-transitory computer-readable media as recited in claim 15, wherein the purchasing entity is one of the plurality of merchants, the operations further comprising withholding a portion of funds from future transactions conducted via the respective computing device associated with the purchasing entity for subsequently collecting the funds from the purchasing entity.

17. The one or more non-transitory computer-readable media as recited in claim 15, wherein:
   the amount of the invoice is for an amount owed by the purchasing entity to the merchant; and
   the operations further comprise determining the terms for the merchant using a plurality of weights received from the merchant, the plurality of weights indicating importance of a plurality of factors for determining invoice terms.

18. The one or more non-transitory computer-readable media as recited in claim 17, wherein the plurality of weights comprise:
   a first weight indicating importance of quick repayment; and
   a second weight indicating importance of full repayment.

19. The one or more non-transitory computer-readable media as recited in claim 15, the operations further comprising determining the terms for the merchant based on one or more additional signals received from one or more additional services, respectively, comprising at least one of an inventory service, a payroll service, an appointment service, a feedback service, or a pickup/delivery service.

20. The one or more non-transitory computer-readable media as recited in claim 15, wherein:
   the invoice is for an amount owed by the purchasing entity to the merchant; and
   the payment processing system is further configured to determine the terms for the merchant based on at least the portion of the transaction information associated with the purchasing entity that includes a transaction history of a plurality of transactions conducted by the purchasing entity.

* * * * *